(12) United States Patent
Webster et al.

(10) Patent No.: US 7,623,439 B2
(45) Date of Patent: Nov. 24, 2009

(54) CYCLIC DIVERSITY SYSTEMS AND METHODS

(76) Inventors: Mark A. Webster, 139 Island View Dr., Indian Harbor Beach, FL (US) 32937; Michael J. Seals, 3870 Shady Run Rd., Melbourne, FL (US) 32934

( * ) Notice: Subject to any disclaimer, the term of this patent is extended or adjusted under 35 U.S.C. 154(b) by 686 days.

(21) Appl. No.: 11/121,661

(22) Filed: May 4, 2005

(65) Prior Publication Data
US 2005/0259567 A1 Nov. 24, 2005

Related U.S. Application Data

(60) Provisional application No. 60/572,481, filed on May 20, 2004.

(51) Int. Cl.
*H04J 11/00* (2006.01)
(52) U.S. Cl. ................................................ 370/203
(58) Field of Classification Search ......... 370/203–210, 370/310, 342–345; 455/562, 101
See application file for complete search history.

(56) References Cited

U.S. PATENT DOCUMENTS

| 6,574,237 B1 | 6/2003 | Bullman et al. ............ 370/465 |
| 6,754,170 B1 | 6/2004 | Ward ........................ 370/208 |
| 6,842,487 B1 * | 1/2005 | Larsson ..................... 375/260 |
| 2002/0136276 A1 | 9/2002 | Franceschini et al. ....... 375/148 |
| 2003/0012160 A1 | 1/2003 | Webster et al. ............. 370/335 |
| 2003/0016621 A1 | 1/2003 | Li ............................. 370/203 |
| 2003/0072284 A1 | 4/2003 | Webster et al. ............. 370/335 |
| 2003/0185241 A1 | 10/2003 | Lu et al. .................... 370/476 |
| 2004/0047284 A1 | 3/2004 | Eidson ....................... 370/203 |
| 2004/0266339 A1 | 12/2004 | Larsson ..................... 455/7 |
| 2005/0157682 A1 * | 7/2005 | Sandhu ...................... 370/334 |
| 2006/0221898 A1 * | 10/2006 | Bossert et al. ............. 370/330 |

OTHER PUBLICATIONS

Webster, et al., "Legacy Compatible Spatial Multiplexing Systems and Methods," having U.S. Appl. No. 11/159,812, filed Jun. 22, 2005.
Webster, et al., "Systems and Methods for Transmitter Diversity Expansion," having U.S. Appl. No. 11/411,619, filed Apr. 26, 2006.
Webster, et al. "Packet Generation Systems and Methods," having U.S. Appl. No. 11/106,915, filed Apr. 15, 2005.
Jon Rosdahl, "Draft PAR for High Throughput Study Group," Nov. 15, 2002, Revision R1: Jan. 16, 2003, IEEE 802.11-02/798r1, pp. 1-9.

(Continued)

*Primary Examiner*—Dmitry Levitan
(74) *Attorney, Agent, or Firm*—McDonnell Boehnen Hulbert & Berghoff LLP

(57) ABSTRACT

Embodiments of cyclic diversity systems and methods are disclosed. One system embodiment, among others, comprises a logic configured to cyclically advance, or perform the periodic equivalent of the same, one or more sections of an orthogonal frequency division multiplexing (OFDM) packet relative to the OFDM packet to be transmitted on a first transmit antenna, the packet having the one or more cyclically advanced sections to be transmitted on a second transmit antenna, the duration of the cyclic advance having a duration less than a guard interval.

21 Claims, 11 Drawing Sheets

OTHER PUBLICATIONS

Jon Rosdahl, "Draft PAR for High Throughput Study Group," Nov. 15, 2002, Revision R6: Mar. 13, 2003, IEEE 802.11-02/798r6, pp. 1-8.

Jon Rosdahl, "Criteria For Standards Development," (Five Criteria) Nov. 15, 2002, IEEE 802.11-02/799r0, pp. 1-4.

Jon Rosdahl, "Criteria For Standards Development," (Five Criteria) Nov. 15, 2002, Revision 1: Jan. 16, 2003, IEEE 802.11-02/799r1, pp. 1-4.

Jon Rosdahl, "Criteria For Standards Development," (Five Criteria) Nov. 15, 2002, Revision 1: Jan. 16, 2003, IEEE 802.11-02/799r2, pp. 1-5.

Jon Rosdahl, "Criteria For Standards Development," (Five Criteria) Nov. 15, 2002, Revision 4: Mar. 11, 2003, IEEE 802.11-02/799r3, pp. 1-4.

Jon Rosdahl, "Criteria For Standards Development," (Five Criteria) Nov. 15, 2002, Revision 5: Mar. 13, 2003, IEEE 802.11-02/799r5, pp. 1-4.

IEEE Std 802® -2001, "802® IEEE Standard for Local and Metropolitan Area Networks: Overview and Architecture," IEEE Computer Society, Mar. 8, 2002.

Manoneet Singh, et al. and Bruce Edwards, et al., "WwiSE proposal: High throughput extension to the 802.11," IEEE 11-04-0886-00-000n, Aug. 13, 2004.

Syed Aon Mujtaba, "TGn Sync Proposal Technical Specification," IEEE 802.11-04/889r0, Aug. 13, 2004.

Aon Mujtaba, Adrian P. Stephens, Alek Purkovic, Andrew Myles, Brian Johnson, Daisuke Takeda, Darren McNamara, Dongjun (DJ) Lee, David Bagby, Eldad Perahia, Huanchun Ye, Hui-Ling Lou, James Chen, James Mike Wilson, Jan Boer, Jari Jokela, Jeff Gilbert, Joe Pitarressi, Jorg Habetha, John Sadowsky, Jon Rosdahl, Luke Qian, Mary Cramer, Masahiro Takagi, Monisha Ghosh, Nico van Waes, Osama Aboul-Magd, Paul Feinberg, Pen Li, Peter Loc, Pieter-Paul Giesberts, Richard van Leeuwen, Ronald Rietman, Seigo Nakao, Sheung Li, Stephen Shellhammer, Takushi Kunihior, Teik-Kheong, Tomoko Adachi, Tomoya Yamaura, Tsuguhide Aoki, Won-Joon Choi, Xiaowen Wang, Yasuhiko Tanabe, Yasuhiro Tanaka, Yoshiharu Doi, Yichi Morioka, Youngsoo Kim, "TGn Sync Proposal," IEEE 802.11-04/888r0, Aug. 13, 2004.

VK Jones, Neil Hamady, Jason Trachewsky, Michael Seals, Stephan ten Brink, George Vlantis, Sean Coffey, "WwiSE IEEE 802.11n Proposal," IEEE 802.11-04/0935r3, Sep. 16, 2004.

Forms PCT/ISA/220, PCT/ISA/210 and PCT/ISA/237.

* cited by examiner

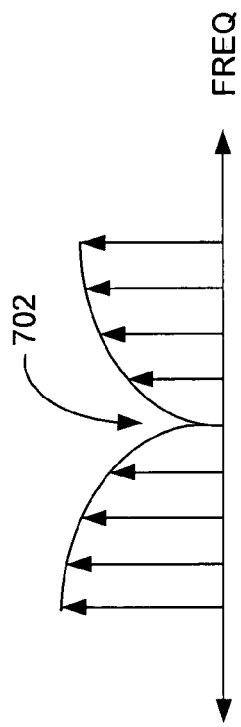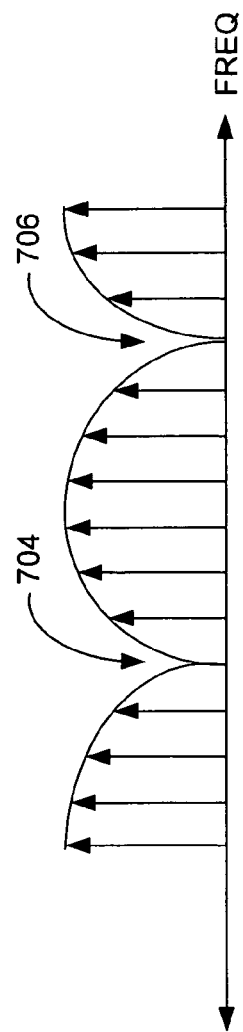

CYCLIC DIVERSITY SYSTEMS AND METHODS

CROSS-REFERENCE TO RELATED APPLICATION

This application claims the benefit of copending U.S. provisional application having Ser. No. 60/572,481, filed May 20, 2004, which is entirely incorporated herein by reference.

BACKGROUND OF THE INVENTION

1. Field of the Invention

The present disclosure is generally related to communication systems, and, more particularly, is related to wireless communication systems and methods 2. Related Art Wireless communication systems are widely deployed to provide various types of communication, such as voice, data, and so on. These systems may be based on code division multiple access (CDMA), time division multiple access (TDMA), orthogonal frequency division multiplex (OFDM), or some other multiplexing techniques. Continual demand for increased data rates has resulted in the advancement of communications system technology, such as the use of multiple antennas in a single device having transmitter and/or receiver functionality. However, in systems utilizing multiple-antenna devices, there is a need to consider legacy receivers (e.g., single-input, single output (SISO), OFDM receivers) and the design challenges concomitant with implementing transmitters with multiple antennas in an environment that still uses legacy receivers.

FIG. 1 is a block diagram that illustrates such a mixed antenna transmitter device/legacy environment. As shown, an 802.11 compliant (e.g., 802.11a, 802.11g) multi-antenna (MA) transmitter device 102 is shown in communication with a SISO 802.11 receiver device 112 (herein simply SISO receiver device 112). The MA transmitter device 102 comprises antennas 104 and 106. The SISO receiver device 112 comprises an antenna 110. The same signals transmitted from antennas 104 and 106 may follow direct paths and multi-paths to antenna 110. Normally, multiple-path signals (e.g., resulting from reflections off of objects in the environment or from multiple antennas) can result in either partial or complete constructive interference or destructive interference of the same signals in a SISO receiver. One mechanism to avoid or mitigate completely destructive interference from multi-path signals is to equip one of the antennas 104 and 106 with a time delay element 108 (or provide a delay through a baseband processing section of the MA transmitter device 102). From the perspective of the SISO receiver device 112, the time delay element 108 appears to cause the signal sent from antenna 106 to reach antenna 110 later than the same signal sent from antenna 104. This technique is often referred to as linear delay diversity, and it's impact on performance of the SISO receiver device 112 is described below.

FIG. 2 is block diagram that describes an exemplary OFDM packet structure 200 used in the transmission of information between the MA transmitter device 102 (FIG. 1) and the SISO receiver device 112 (FIG. 1). Additional information about the packet structure can be found in 802.11 standards. The packet structure 200 is generated in a baseband processing section (e.g., in or in cooperation with an inverse fast Fourier transform (IFFT) operation) of the MA transmitter device 102, and comprises several sections. Sections A and B are comprised of short training symbols (STS). Section A is used by a communication system to provide signal detection, automatic gain control (AGC), and diversity selection functionality. Section B is used by a communication system to provide coarse frequency offset estimation and timing synchronization. Section C, sometimes referred to as a long training symbol (LTS), is used by a communication system to provide channel and fine frequency offset estimation. Section D is referred to as the signal field or header, and contains data rate and packet length information. Sections E and F are OFDM symbols. Sections D, E, and F provide rate length, service and data, and data, respectively. Section F is used as an exemplary OFDM symbol for the discussion below, and will be referred to as an OFDM symbol 300.

FIG. 3A is a block diagram that illustrates exemplary OFDM symbols 300a, 300b, and 300c (herein, simply referenced as OFDM symbol 300) shown in a time-domain perspective. Each OFDM symbol 300 comprises a guard interval (GI) 302, which provides a buffer between symbols 300. That is, multipath is equivalent to echoes, and the guard intervals 302 comprise a zone built into an OFDM symbol 300 into which echoes from a preceding OFDM symbol are positioned. Such echoes cause inter-symbol interference. The guard intervals 302 are inserted in the OFDM symbol 300 in the baseband processor portion of the MA transmitter device 102 (FIG. 1), and are used to capture unwanted multipath-induced inter-symbol interference at the SISO receiver device 112 (FIG. 1). In an 802.11 implementation, each symbol 300 is approximately 4 microseconds ($\mu$sec) in duration. For instance, of the 80 samples in an OFDM symbol waveform, the guard interval 302 consumes 16 samples (the data portion comprising 64 samples). Fast Fourier transforms (FFT) applied at the SISO receiver device 112 (e.g., 64-point FFT) occur (or are placed) in the 3.2 ($\mu$sec) interval of each OFDM symbol 300. That is, the SISO receiver device 112 discards the 0.8 $\mu$sec duration guard interval 302 on each received 4 $\mu$sec OFDM symbol, leaving 3.2 $\mu$sec of signal (which comprises all of the information of the OFDM symbol) to FFT. No echoes are included in the 3.2 $\mu$sec interval (inter-symbol interference free). Thus, reference to "placing" or "to place" or "placement" of the FFT is understood to comprise a process or method of extracting the correct 3.2 $\mu$sec from each 4 $\mu$sec interval for implementing the FFT.

FIG. 3B is a sub-carrier level view of the OFDM symbol 300 of FIG. 3A shown in a frequency domain perspective, and is helpful to consider in understanding how the guard intervals 302 (FIG. 3A) are created. An OFDM symbol 300 comprises a plurality of frequency subcarriers or tones 304 (e.g., 52 data subcarriers in an 802.11a or 802.11g OFDM symbol, although only a portion of the 52 are shown) distributed in both frequency directions from a center or direct current (DC) frequency. The subcarriers or tones 304 spin at progressively increasing rotations in an in-phase (I)/quadrature (Q) plane from center frequency. Assuming no guard interval insertion, the subcarrier located at frequency position 306 spins counter-clockwise (e.g., in a direction of increasing positive angles off of the x-axis) in an I/Q plane one cycle over one-64 sample period of the symbol 300. The subcarrier located at frequency position 308 spins clockwise (e.g., in a direction of negative angles off of the x-axis) in an I/Q plane one cycle over the 64 samples. The subcarrier located at frequency position 310 spins counter-clockwise two cycles over the 64 samples, and the subcarrier located at frequency position 312 spins clockwise two cycles over the 64 samples, and so on. Thus, with the guard intervals left out, what remains is a continuous waveform that repeats itself every 64-samples. The guard intervals 302 are a time domain extension of the subcarriers 64 time samples, pre-spinning an additional 16 time domain samples. That is, subcarrier time samples are allowed to "pre-spin" out 16 samples, resulting in guard intervals being created as cyclic extensions of the spin of the subcarrier time samples. Thus, each subcarrier is allowed to spin approximately 25% more than the subcarrier spin without the guard intervals 302.

In light of the aforementioned background, and with continued reference to FIGS. 1-3B, consider how linear delay diversity impacts the symbol stream at the MA transmitter device 102 and the SISO receiver device 112. FIG. 4A is a block diagram that shows partial packet structures 200a and 200b, each having three symbols 300 (designated as symbol 1, symbol 2, and symbol 3) comprising guard intervals 302. Packet structure 200b is a delayed version of packet structure 200a. Packet structure 200b is delayed (e.g., by delay element 108) a time delay duration designated as $t_D$.

With continued reference to FIGS. 1-4A, FIG. 4B is a block diagram that illustrates how the SISO receiver device 112 handles the received packet structures 200a and 200b shown in FIG. 4A. That is, FIG. 4B illustrates a single received signal (comprising the addition of the two transmit signals corresponding to packet structures 200a and 200b) output from the single receive antenna 110. The SISO receiver device 112 determines the guard interval and symbol location (and FFT placement) through an acquisition process that includes a correlation of the known pattern corresponding to the LTS (e.g., section C of the OFDM packet 200 (FIG. 2)). Legacy receivers may perform a channel impulse response (CIR) estimate using the LTS. The LTS is designed to elicit an impulse response when correlated with multi-path, thus resulting in a multi-path profile. In the absence of a time delay (or in the absence of multi-path), the response to a received packet is an impulsive correlation (which would be shown as a single impulse 402a in the guard interval 302), enabling proper timing or synchronization of the received signal and proper placement of the FFT. With the time delay ($t_D$) (or with multi-path), two impulsive responses (402a and 402b) are detected. The FFT is placed after the detection of the second impulse response 402b. Thus, FFT placement is accomplished by using the impulse response(s) to center the guard interval 302 on the transients so that inter-symbol interference ISI is minimized.

Linear delay diversity results in true delays that exhibits a behavior from a receiver perspective that is indistinguishable from true multi-path (e.g., the situation where the signal bounces off an object and arrives at the SISO receiver device 112 with a time delay due to the greater path distance traveled). Further, with linear delay diversity, complete destructive interference is avoided, but at the expense of the consumption of the guard intervals 302.

Another technique used to make MA transmitters compatible with legacy receiver devices is referred to as cyclic delay diversity. With cyclic delay diversity, each tone or subcarrier is cyclically shifted (e.g., in the baseband processing portion of the MA transmitter device 102, FIG. 1) by a defined amount of samples, resulting in a circular shift of all of the samples involved (e.g., 64 samples plus 16 samples of the data and guard interval, respectively). FIG. 5 is a schematic diagram that illustrates 1-sample cyclic delay diversity. The first tier 502 represents 80 total samples comprising 64 samples of symbol data 508 and 16 samples that are used for a guard interval 510. The second tier 504 is simply an extension of the first tier, showing the guard interval 510 corresponding to samples 510 adjacent to the next set of samples. This next set of samples comprises 64 samples of symbol data 512 and 16 samples corresponding to the guard interval 514a. The third tier 506 represents a 1-sample cyclic delay shift. As shown, a delay of 1 sample results in the guard interval 514b preceding the 80 sample symbol in the third tier 506, starting with sample 4/7, as indicated by line 516. All of the other samples are likewise shifted as represented by the dotted arrow-head lines 518.

From a receiver standpoint, the guard intervals 510, 514b remain aligned, as represented by the dashed line 520. In other words, with cyclic delay diversity, guard intervals are not consumed as they are in linear delay diversity. The samples used for each guard interval are different after a cyclic shift, but the guard intervals still remain as 16 samples. However, one problem with cyclic delay diversity involves the acquisition process described earlier. When correlation occurs at the SISO receiver device 112 (FIG. 1), the sample shifting is detected, such shifting being indistinguishable from the sample shifting that occurs in linear delay diversity. In other words, the impulse response appears to shift directly with the cyclic shift. However, the true location of the guard interval does not change because the MA transmitter device 102 (FIG. 1) is using cyclic shifts. This can spoof the SISO receiver device 112 such that the FFT placement is erroneous. That is, the SISO receiver device 112 may shift the FFT over in a manner that spills over to the subsequent guard interval.

SUMMARY

Embodiments of cyclic diversity systems and methods are disclosed. One system embodiment, among others, comprises a logic configured to cyclically advance, or the periodic equivalent, one or more sections of an orthogonal frequency division multiplexing (OFDM) packet relative to the OFDM packet to be transmitted on a first transmit antenna, the packet having the one or more cyclically advanced sections to be transmitted on a second transmit antenna, the duration of the cyclic advance having a duration less than a guard interval.

One method embodiment, among others, comprises providing an orthogonal frequency division multiplexing (OFDM) packet corresponding to a first transmit antenna, and cyclically advancing, or the periodic equivalent, one or more sections of the OFDM packet corresponding to a second transmit antenna, the duration of the cyclic advance having a duration less than a guard interval.

Other systems, methods, features, and advantages of the disclosed systems and methods will be or become apparent to one with skill in the art upon examination of the following drawings and detailed description. It is intended that all such additional systems, methods, features, and advantages be included within this description and be within the scope of the disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

FIGS. 7A-7B are schematic diagrams that illustrate two frequency selective spectrums that vary based on the amount of delay or advancement used.

DETAILED DESCRIPTION

Disclosed herein are various embodiments of cyclic diversity systems and methods, herein cyclic diversity systems. In one embodiment, a cyclic diversity system comprises a multiple-antenna, 802.11 compliant (e.g., 802.11a, 802.11g, proposed 802.11n) transmitter device configured with cyclic extension logic that provides cyclic advance diversity, among other diversity (e.g., cyclic delay, linear delay, etc.) to one or more sections of orthogonal frequency division multiplexing (OFDM) packet structures or OFDM continuous data streams (herein packet(s) or continuous data stream(s) may each be referred to as a segment or segments). That is, cyclic diversity can be applied to one or more of the sections (e.g., long training symbols, short training symbols, OFDM symbols, etc.) or periodic structures of a segment (e.g., packet or continuous data stream) in the time domain (or the subcarrier structures in the frequency domain). By providing cyclic advances, cyclic shift diversity is employed which enables legacy receivers to experience improved packet error rate performance when compared to conventional diversity mechanisms, among other benefits.

Figure 1:
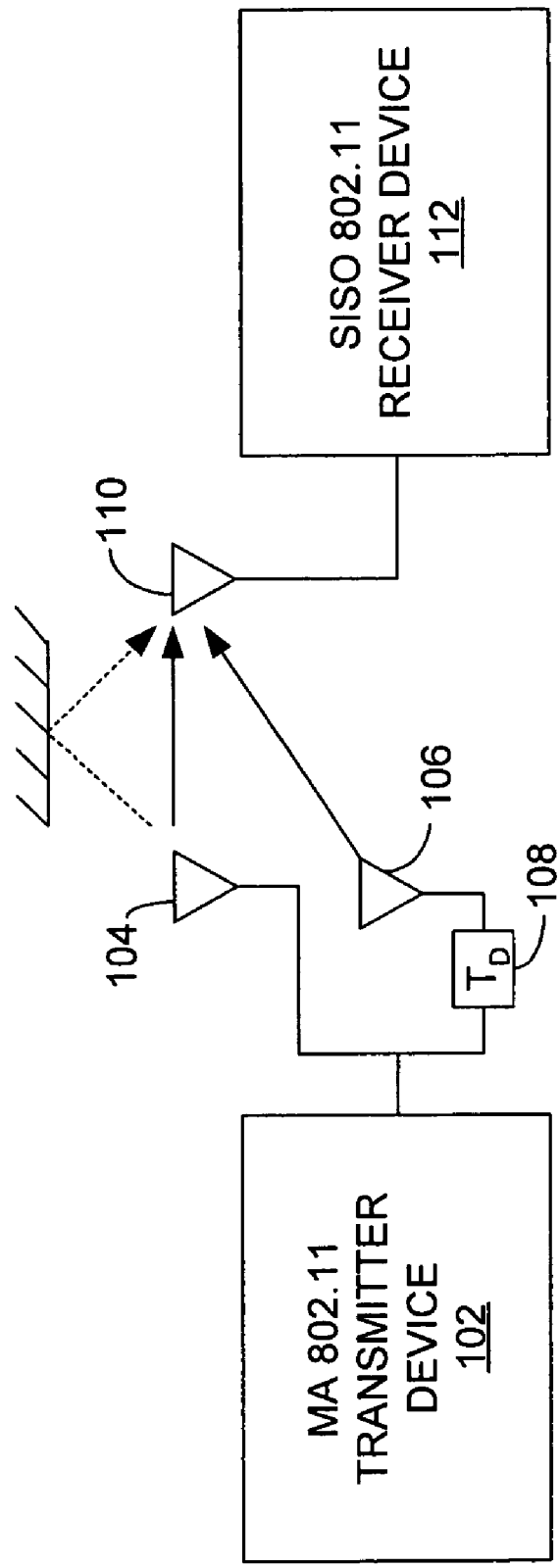
FIG. 1 is a block diagram that illustrates a communication system comprising a multiple-antenna (MA) transmitter device and a single-input, single-output (SISO) receiver device.
Figure 2:
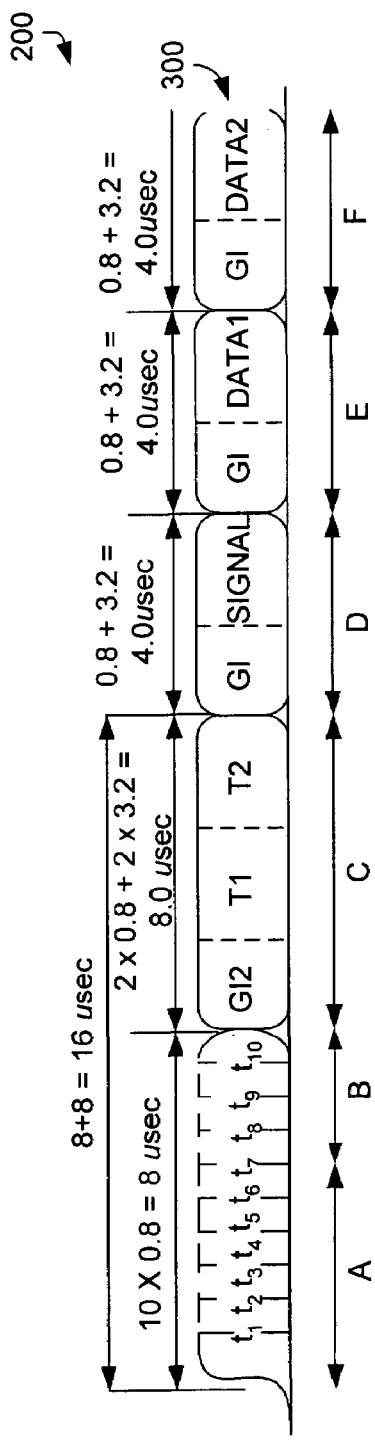
FIG. 2 is block diagram that describes an exemplary OFDM packet structure used in the communication system shown in FIG. 1.
Figure 6:
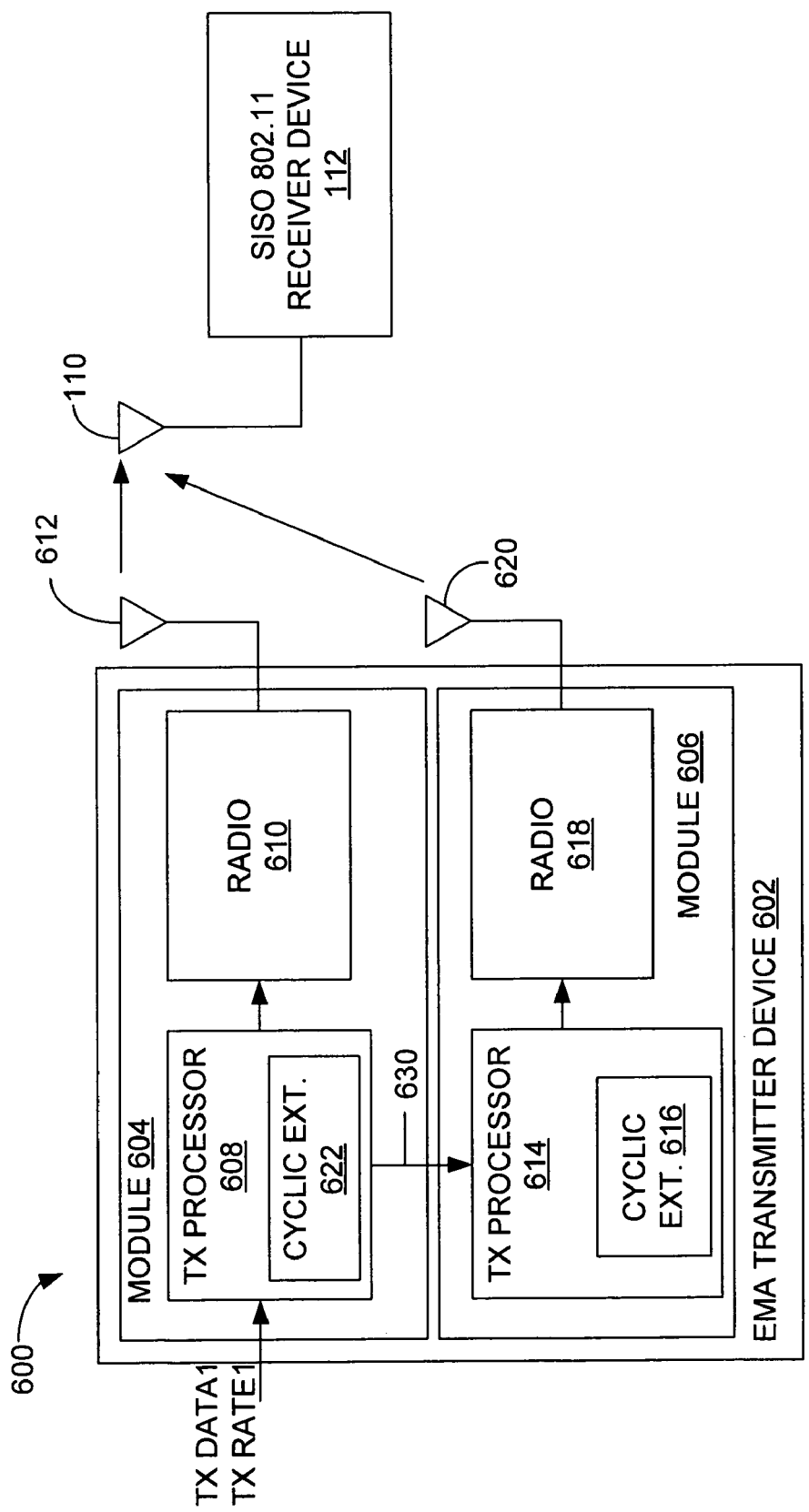
FIG. 6 is block diagram that illustrates a communication system comprising an embodiment of an enhanced, multiple-antenna (EMA) transmitter device and a SISO transmitter device.

FIG. 6 is block diagram that illustrates a communication system 600 comprising an embodiment of an enhanced, multiple-antenna (EMA) transmitter device and a single-input, single-output (SISO) receiver device. In particular, the communication system 600 comprises an EMA transmitter device 602 and a legacy receiver device 112, the legacy receiver device 112 described in association with FIG. 1. The EMA transmitter device 602 may be implemented using individual SISO transmissions (e.g., one spatial stream per antenna) or using multiple-input, multiple-output (MIMO) technology that enables simultaneous or substantially simultaneous transmission over two or more spatial streams in the same spectrum. In other words, cyclic diversity may be applied to MIMO one spatial stream preambles, headers, and data symbols as well as to one or more sections of SISO transmission packets. The EMA transmitter device 602, or one or more components of the EMA transmitter device 602 may also be referred to as a cyclic diversity system. In some embodiments, a cyclic diversity system may comprise one or more components of a receiver device. In one embodiment, the EMA transmitter device 602 is compliant with 802.11 standards (e.g., proposed 802.11n), and comprises modules 604 and 606. The EMA transmitter device 602 and/or the SISO receiver device 112 may each be embodied in any wireless (e.g., radio frequency) communication device, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc.

Module 604 comprises a transmit (TX) processor 608, which includes baseband processing modules (i.e., logic, such as hardware and/or software) that comprise functionality for encoding, interleaving, mapping, and OFDM symbol generation and processing. In one embodiment, as part of the symbol generation and processing functionality, the transmit processor 608 comprises a cyclic extension module 622 that provides for cyclic extension (e.g., guard intervals) insertion and cyclic advance diversity. In some embodiments, cyclic extension insertion may be implemented by a different module. Further, the cyclic extension module 622 may provide for delay diversity (cyclic and/or linear). The delay and/or cyclic advance may be a configurable and switchable function. For instance, the cyclic delay and/or advance functionality may be switched off or disabled (e.g., through processing functionality in the transmit processor 608) when transmission delay is not implemented on the corresponding antenna 612. Further, the transmit processor 608 may deliver a cyclic advance in some transmissions, and switch the functionality to deliver a cyclic (or linear) delay. Module 604 further comprises radio circuitry 610 in communication with the transmit processor 608 and an antenna 612.

Module 606 comprises similar components and functionality to module 604, including a transmit processor 614, radio circuitry 618, and antenna 620. Transmit processor 614 further comprises a cyclic extension module 616, that operates in similar manner to cyclic extension module 622, and thus the discussion of the same and other like components of module 606 is omitted for brevity.

Note that in some embodiments, the communication system 600 may comprise multiple-antenna receiver devices mixed with SISO receiver devices. Also, in some embodiments, transmitter functionality may be included in one or more receiver devices of the communication system 600 and/or receiver functionality may be included in one or more transmitter devices of the communication system 600.

In operation, transmit processors 608 and 614 encode and interleave the incoming data (designated TX data1 at TX data rate1 at module 604, which is also provided to module 606 as represented by connection 630). Transmit processors 608 and 614 map the interleaved data into respective sub-carrier channels as frequency domain symbols. Inverse fast Fourier transform (IFFT) logic in baseband processing circuitry of the transmit processors 608 and 614 performs an inverse fast Fourier transformation on the frequency domain symbols to create OFDM symbols.

Cyclic extension modules 616 or 622 provide for cyclic extension insertion and/or advance diversity (and delay diversity in some embodiments). In one embodiment, the cyclic advance is approximately 100 nano-seconds (nsec). The choice of duration for the advance depends on several considerations. FIGS. 7A-7B are schematic diagrams that illustrate two frequency selective spectrums 700a and 700b, respectively, that vary based on the amount of delay or advancement used. When providing advance or delay diversity, intentional multi-path is created, which in turn creates frequency selective fading. With reference to FIG. 7A, introducing one sample delay or advance introduces a "notch" 702 in the waveform, with a location of that notch 702 depending at least in part on phase of the second (delayed) signal. If the notch falls in the center, a significant portion of the signal waveform is eliminated.

With reference to FIG. 7B, introducing a two-sample delay or advance introduces notches 704 and 706 in two locations. By using a two-sample delay or advance, although more notches are introduced, the center portion of the signal waveform (50% of the signal waveform) is "flattened" out, thus preserving a significant portion of the waveform.

In some embodiments, additional cyclic extension modules corresponding to additional antennas may be used, and a variation of delays and advances may be implemented. For instance, and with continued reference to FIG. 6, antenna 612 may transmit with no delay or advance, antenna 620 may transmit with an advance, a third antenna may transmit with a delay, and a fourth antenna may transmit with an advance. Additional functionality, such as digital-to-analog (D/A) functionality, may also be included in the transmit processors 608 and 614, as would be understood by one having ordinary skill in the art.

With reference to FIG. 6, the transmit processors 608 and 614 provide the processed data to radio circuitry 610 and 618, which provides such well-know functions as filtering, modulation, amplification, and conversion (e.g., upconversion) functionality. The radio circuitry 610 and 618 provide the processed signals (e.g., no advance and no delay, and advanced, respectively) to antennas 612 and 620, from which the transmitted signals are delivered to SISO receiver device 112.

The signals transmitted from antennas 612 and 620 are received at antenna 110 of SISO receiver device 112, demodulated and converted to baseband, and processed to recover the transmitted data.

Figure 8:
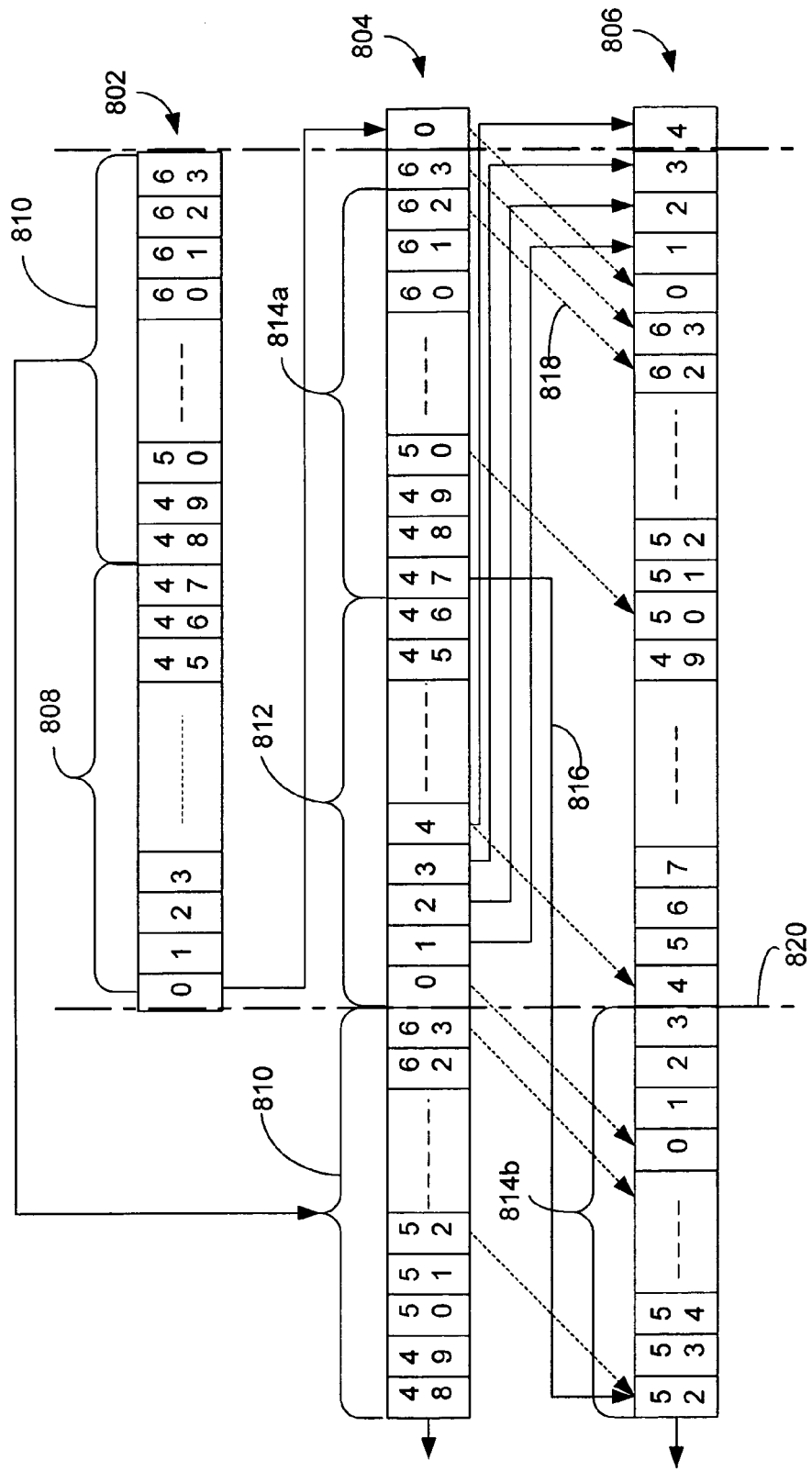
FIG. 8 is a schematic diagram that illustrates cyclic advance diversity as implemented by the communication system shown in FIG. 6.

FIG. 8 is a schematic diagram that illustrates 4-sample cyclic advance diversity as implemented by the communication system 600 shown in FIG. 6. The first tier 802 represents 80 total samples comprising 64 samples of symbol data 808 and 16 samples that are used for a guard interval 810. The second tier 804 is simply an extension of the first tier 802, showing the guard interval corresponding to samples 810 adjacent to the next set of samples. This next set of samples comprises 64 samples of symbol data 812 and 16 samples corresponding to the guard interval 814a. The third tier 806 represents a 4-sample cyclic advance shift. As shown, an advance shift of 4 samples results in the guard interval 814b preceding the 80 sample symbol in the third tier 806 starting with sample 5/2, as represented by line 816. All of the other samples are likewise shifted as represented by the dotted arrow-head lines 818.

From a receiver standpoint, the guard intervals 810, 814b remain aligned, as represented by the dashed line 820. In other words, with cyclic advance diversity, and similar to cyclic delay diversity, guard intervals are not consumed as they are in linear delay diversity. However, unlike cyclic delay diversity, cyclic advance diversity does not result in net shifting of the FFT. That is, the FFT placement remains substantially centered and unshifted. One reason for this phenomenon is that the cyclic shifts created by the cyclic extension modules 616 and 622 (FIG. 6) provide a shift that is in a direction opposite to any FFT shift that occurs in response to multi-path created by the multiple antennas and reflections.

Figure 3A:
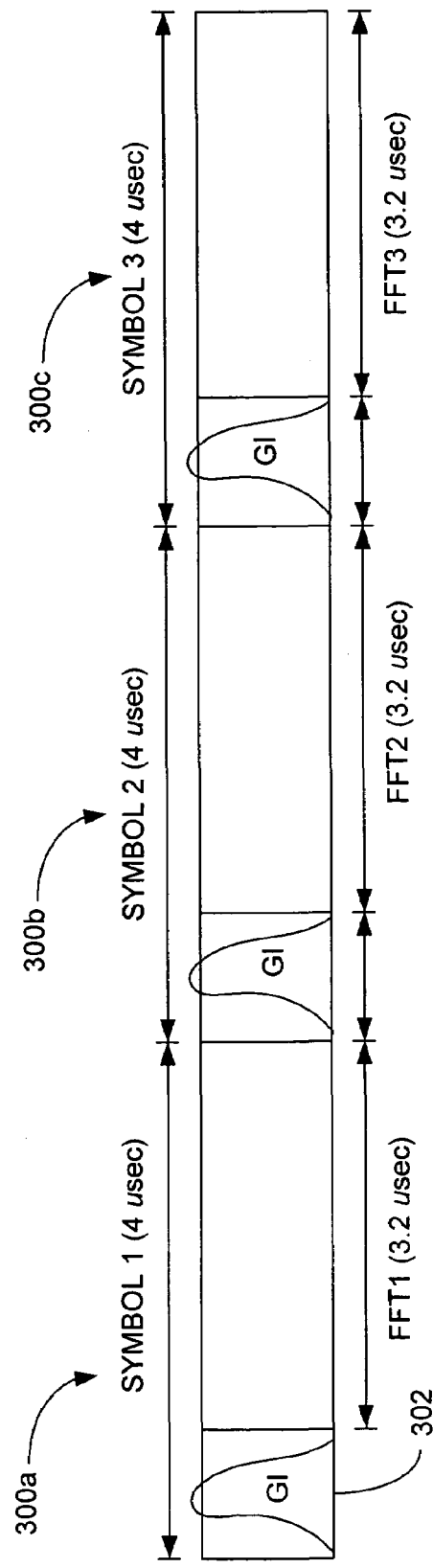
FIGS. 3A-3B are block diagrams that illustrates exemplary OFDM symbol structures.
Figure 3B:
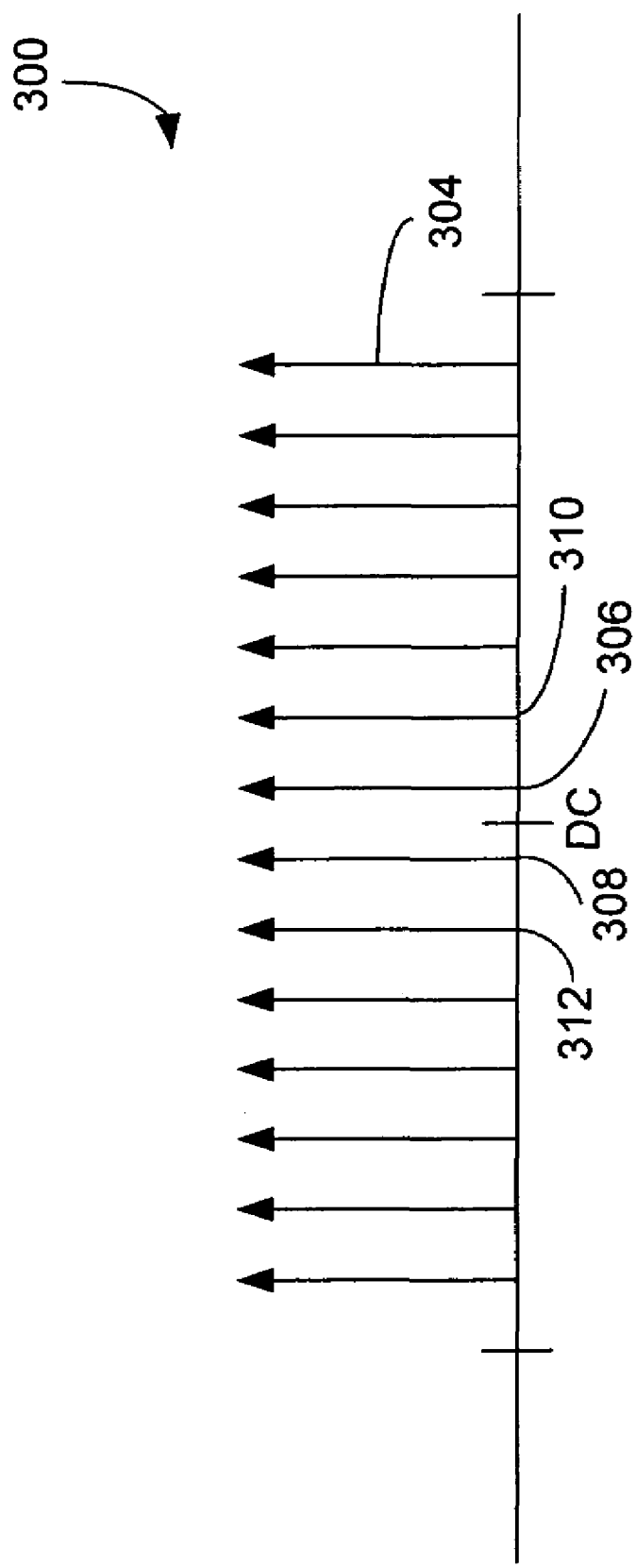
Figure 4A:
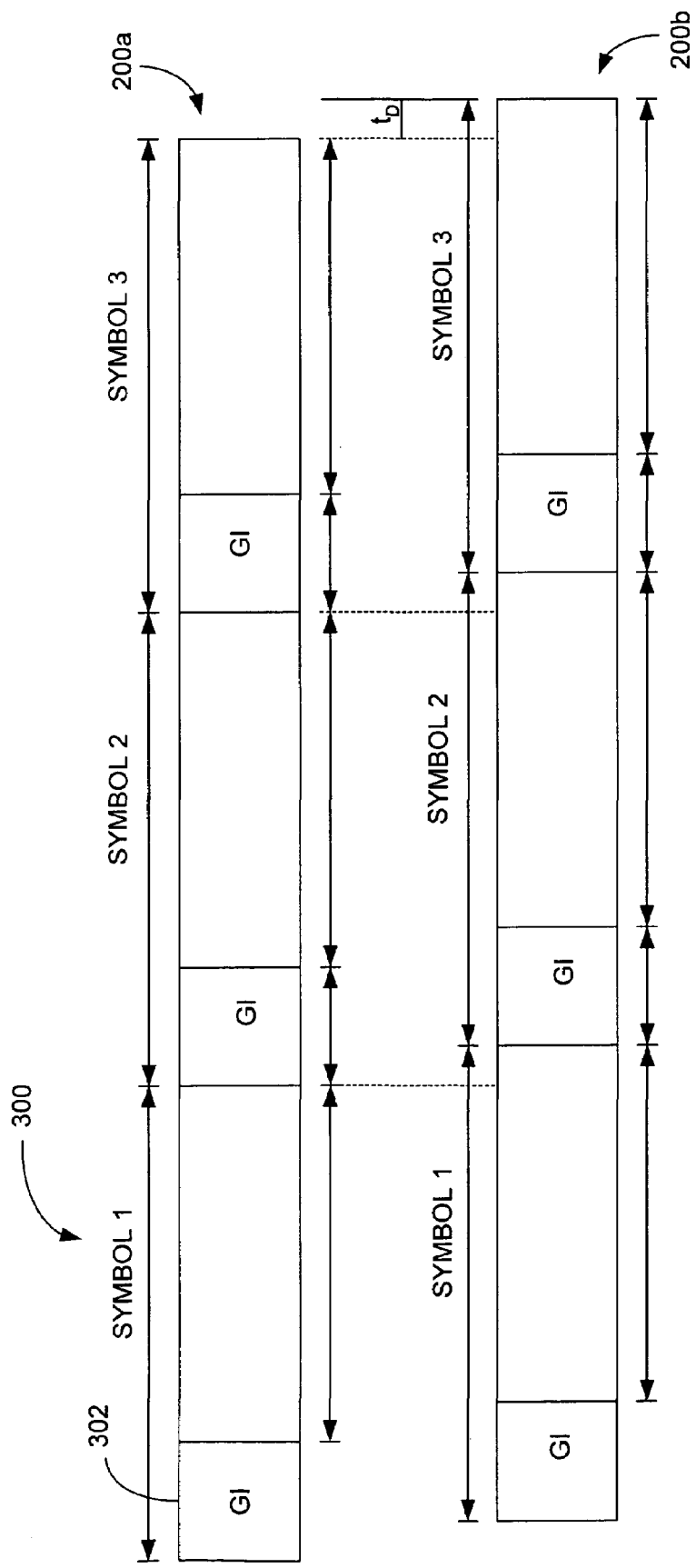
FIGS. 4A-4B are block diagrams that illustrate the processing of packet structures in the context of linear delay diversity.
Figure 4B:
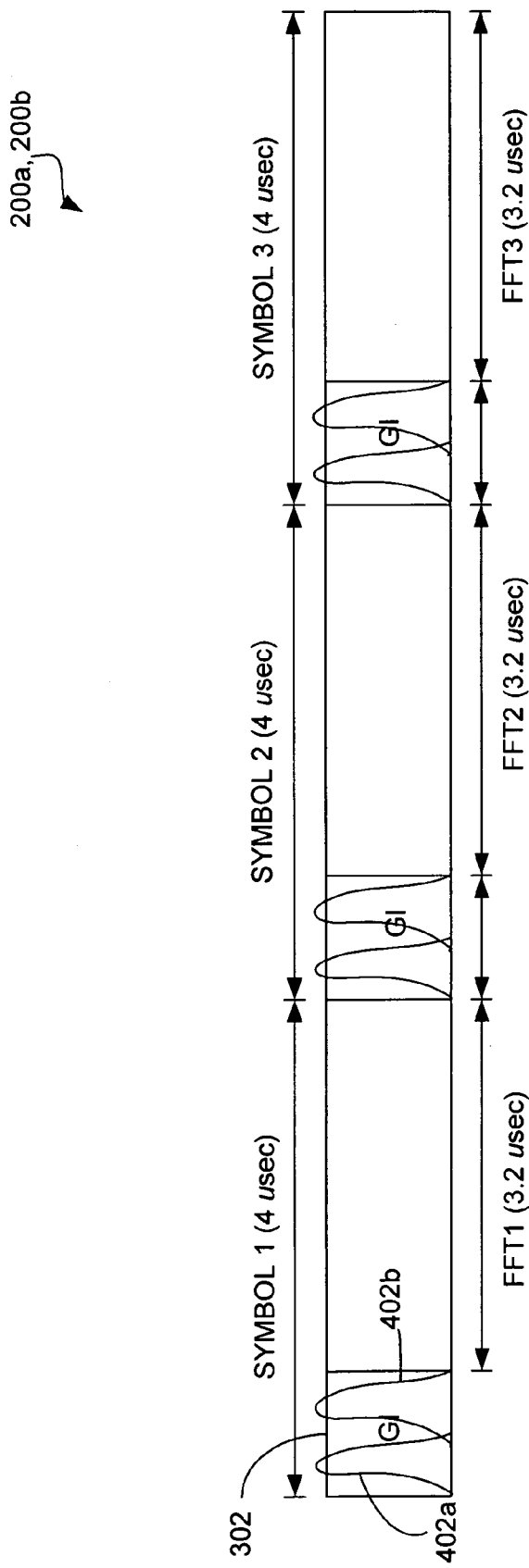
Figure 5:
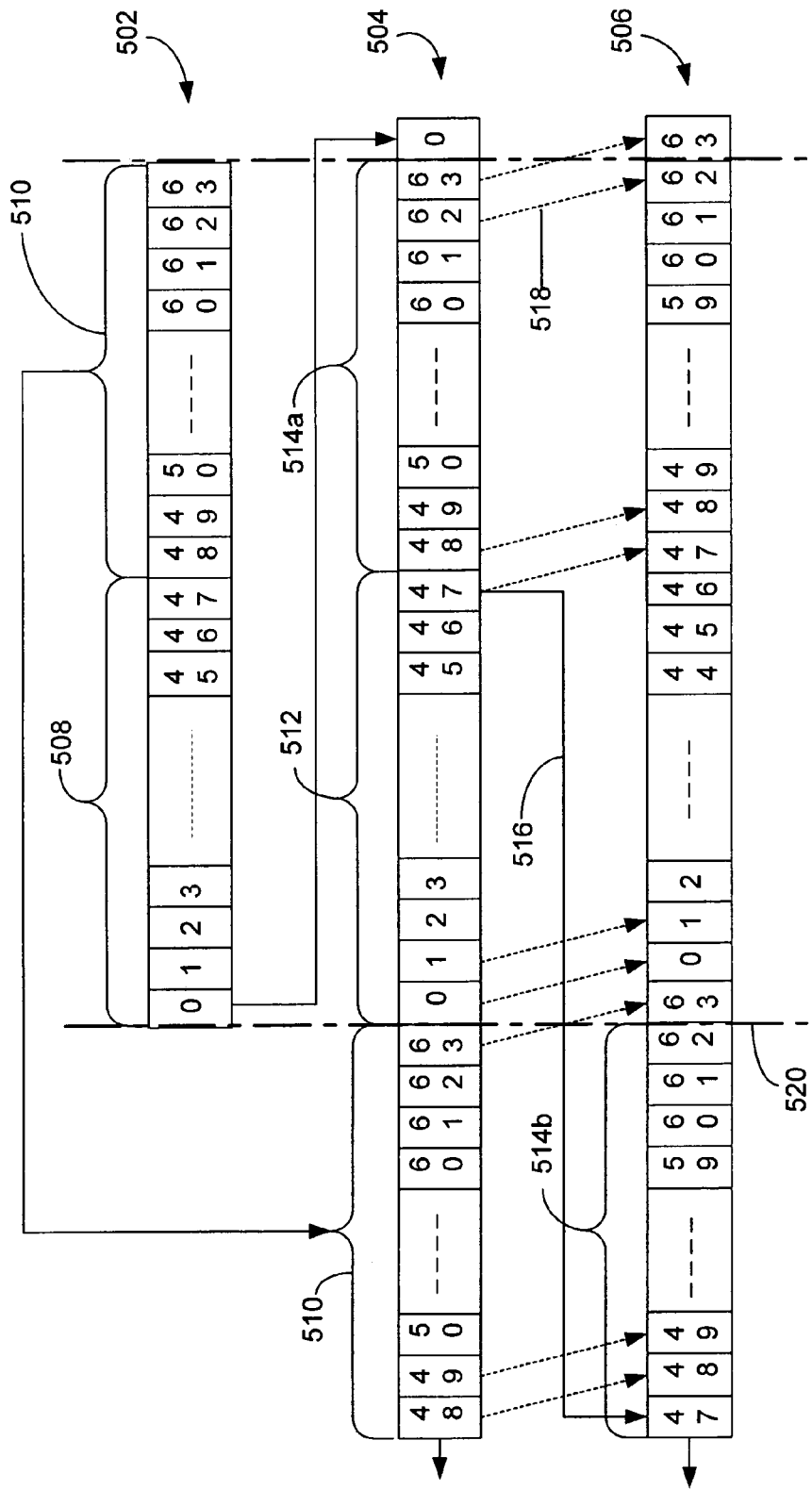
FIG. 5 is a schematic diagram that illustrates 1-sample cyclic delay diversity.

As is shown below, small cyclic advances are preferred over small cyclic delays, since the SISO receiver 112 (FIG. 1) handles small amounts of delays or advances because they are designed in the context of expected multipath. That is, the SISO receiver device 112 is designed to handle a multi-path spread (e.g., defined as the time spread from a first multipath ray arrival and a last multipath arrival at the SISO receiver device 112) of up to approximately 200 nsec. For instance, an 802.11 compliant WLAN transmitter device may transmit a packet with a guard interval having a duration of approximately 800 nsec. The guard interval, as described above, is designed to catch multipath. Shifts should look like multipath to a legacy receiver device, and thus are preferably less in duration that the duration of the guard interval. Due to the periodic nature of OFDM subcarriers, mathematically, a small cyclic advance of 100 nsec is identical or equivalent to a large delay of 3100 nsecs (the OFDM symbol waveform repeats with a period of 3.2 μsec or 3200 nsec). In other words, 3100 nsec is a periodic equivalent to 100 nsec. Likewise, a small delay of 100 nsec is identical to an advance of 3100 nsec, again due to the periodic nature of the OFDM symbol 300 (e.g., FIG. 3). Thus, a signal received by the SISO receiver device 112 (FIG. 6) having a cyclic advance of 100 nsec or a signal having a cyclic delay of 3100 nsec is processed as an identical signal from the perspective of the SISO receiver device 112, since the EMA transmitter device 602 (FIG. 6) transmits the identical signal in each case. Since a circular shift is indeed circular, the FFT placement is at the same position shifting in either direction (100 nsec advance, 3100 nsec delay). What has been determined experimentally is that small cyclic advances are superior to small cyclic delays.

Figure 9:
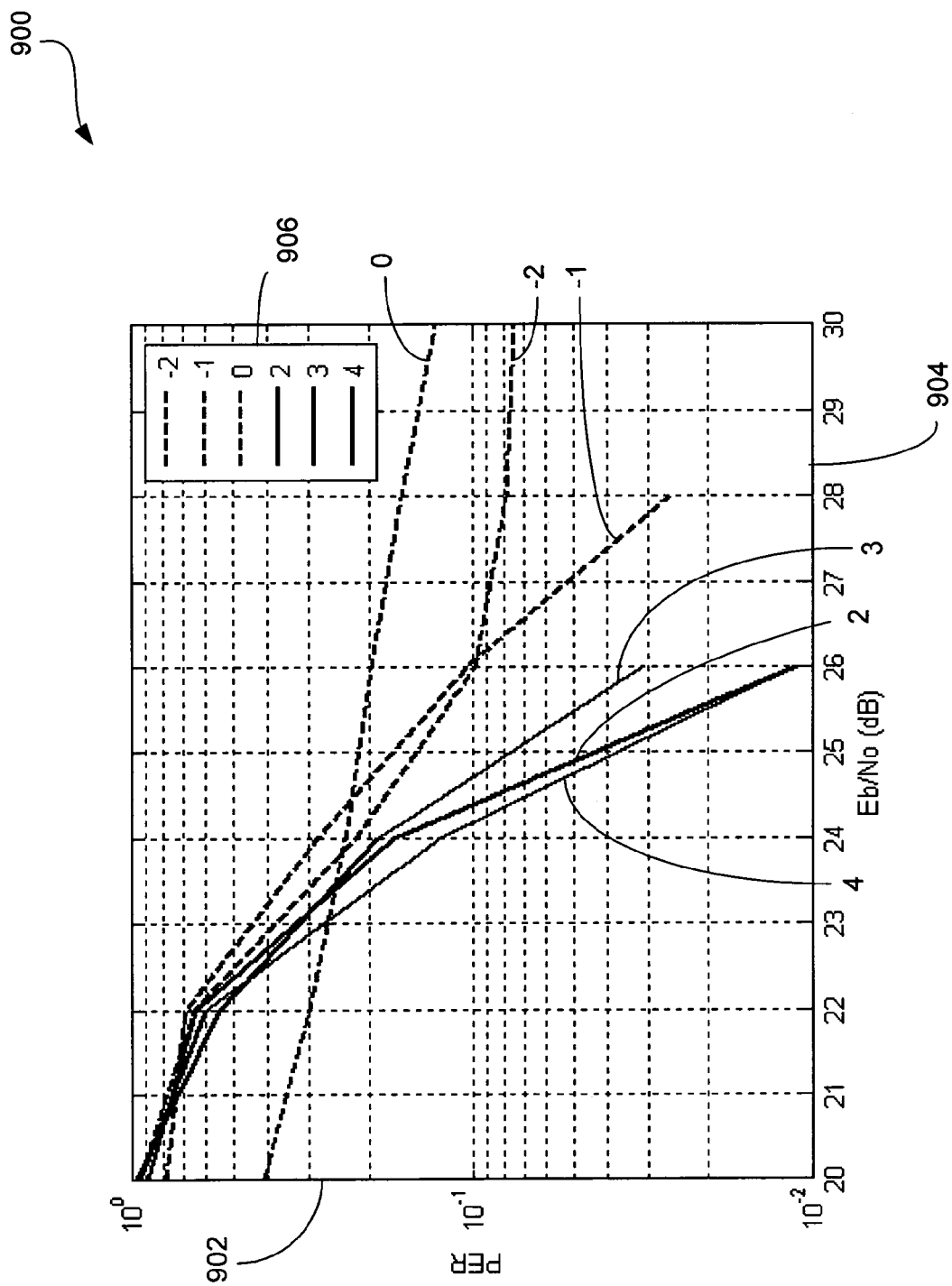
FIG. 9 is a plot that illustrates packet error performance of cyclic advance diversity compared to cyclic delay diversity.

Experimental testing has shown that legacy radios show significant performance gains in packet error rate with small advancements (e.g., 100 nsec) as opposed to large delays (e.g., that span an almost an entire FFT). FIG. 9 is a plot that illustrates packet error performance of cyclic advance diversity compared to cyclic delay diversity. In particular, FIG. 9 shows a plot 900 of the packet error performance (PER) on the y-axis 902 (0.1 corresponds to 10% PER), and the x-axis 904 is the Eb/No ratio in decibels (dB), where $E_b$ is the energy per information bit and $N_0$ is the (one-sided) noise power spectral density. The legend 906 shows numbers −2 through 0 and 2 through 4. The numbers 2-4 correspond to cyclic advance diversity of 2-4 samples, respectively. Two (2) sample shifts is equal to 100 nsec, three (3) sample shifts are equal to 150 nsec, and four (4) samples shifts is equal to 200 nsec. The −1 and −2 are cyclic delays of 1-sample (50 nsec) and 2-samples (100 nsec), respectively. The 0 corresponds to a situation in which the second antenna had no delay relative to the first antenna, so signals were not separable by a SISO receiver device. The sample rate corresponding to the curves in this plot 900 was 20 MHz for an 802.11 OFDM. As shown in the plot 900 of FIG. 9, the lower the curve, the better the PER performance for a particular SNR. The cyclic advance diversity, such as shown in curves 2-4 works well and indeed is generally superior in PER performance to cyclic delay diversity. Additional performance curves may be found in the provisional application referenced in the cross-reference to related applications section of this disclosure.

Embodiments of a cyclic extension system, comprised of one or more components of the EMA transmitter device 602 (FIG. 6) (e.g., such as cyclic extension modules 616 and/or 622), can be implemented in hardware, software, firmware, or a combination thereof. If implemented in hardware, such embodiments can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Functionality of one or more components that comprise embodiments of a cyclic extension system may also be implemented in software or firmware that is stored in a memory and that is executed by a suitable instruction execution system.

Figure 10:
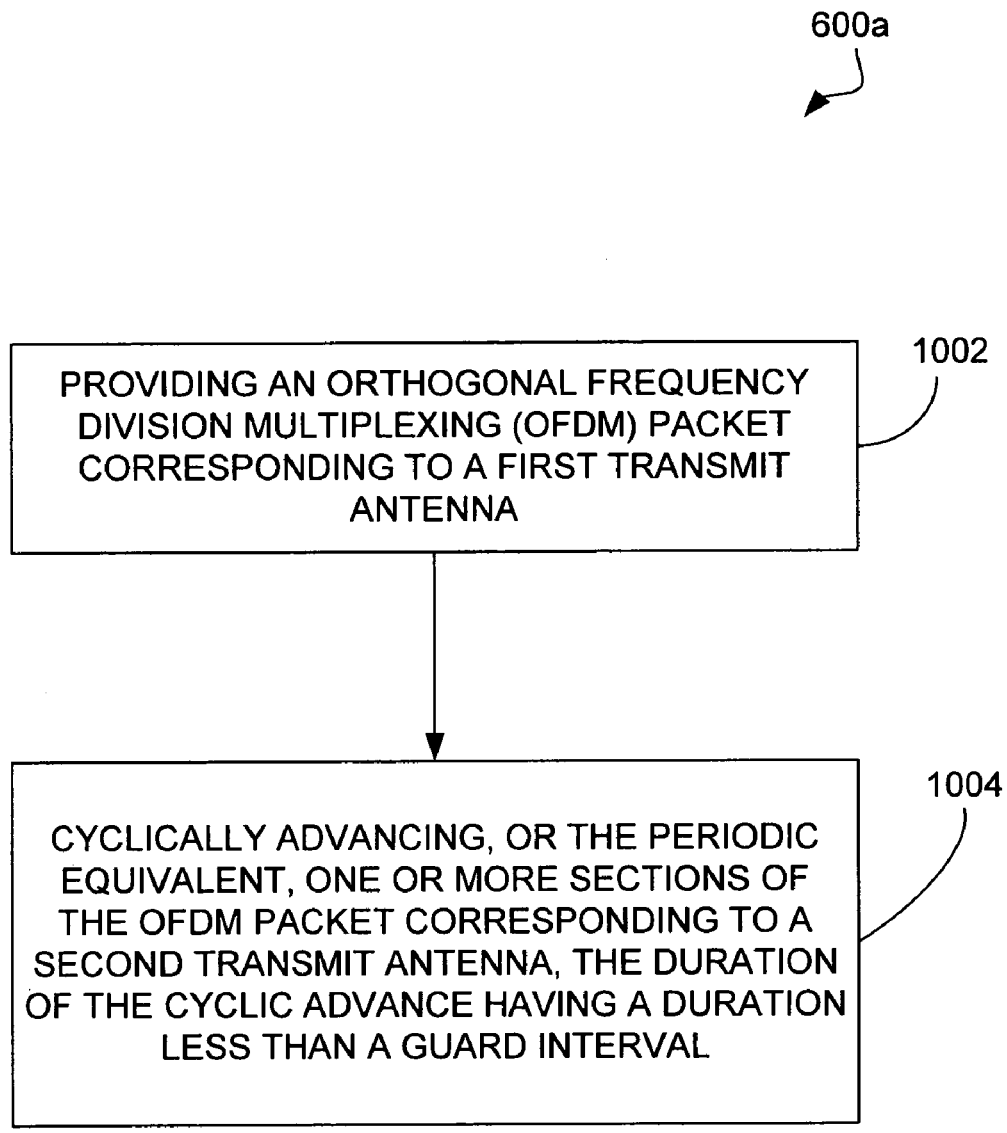
FIG. 10 is a flow diagram of one embodiment of a cyclic diversity method.

In light of the above description, it will be appreciated that a cyclic diversity method embodiment 600a may be described by the flow diagram illustrated in FIG. 10. In particular, the method 600a comprises providing an orthogonal frequency division multiplexing (OFDM) packet corresponding to a first transmit antenna (1002) and cyclically advancing, or performing the periodic equivalent of the same, one or more sections of the OFDM packet corresponding to a second transmit antenna, the duration of the cyclic advance having a duration less than a guard interval.

Any process descriptions or blocks in flow charts should be understood as representing modules, segments, or portions of code which include one or more executable instructions for implementing specific logical functions in the process, and alternate implementations are included within the scope of the embodiments in which functions may be executed out of order from that shown or discussed, including substantially concurrently or in reverse order, depending on the functionality involved, as would be understood by those reasonably skilled in the art.

It should be emphasized that the above-described embodiments of the disclosure, particularly, any "preferred" embodiments, are merely possible examples of implementations, merely set forth for a clear understanding of the principles of the disclosed systems and methods. Many variations and modifications may be made to the above-described embodiment(s) without departing substantially from the scope of the disclosure. All such modifications and variations are intended to be included herein within the scope of this disclosure s.

What is claimed:

1. A method for transmitting orthogonal frequency division multiplexing (OFDM) signals comprising:
    generating a first OFDM packet for transmission including a guard interval portion and a symbol data portion each comprised of a plurality of samples;
    cyclically advancing the first OFDM packet by shifting the samples in a first direction an amount less than a sample duration of the guard interval portion to generate a shifted version of the first OFDM packet for transmission in which at least a non-zero number of the samples from the symbol data portion of the first OFDM packet are shifted into the guard interval portion of the shifted version and a same non-zero number of samples from the guard interval portion of the first OFDM packet are shifted out of the guard interval portion of the shifted version; and
    substantially simultaneously transmitting the first OFDM packet and the shifted version of the OFDM packet.

2. The method of claim 1, further comprising cyclically advancing the OFDM packet for a duration of less than approximately 800 nanoseconds.

3. The method of claim 1, further comprising cyclically advancing the OFDM packet for a duration of less than one half of the sample duration of the guard interval portion.

4. The method of claim 1, further comprising a legacy receiver, and wherein the cyclical advancements of the shifted version of the OFDM packet cause the legacy receiver to produce a plurality of impulse responses in an acquisition process, and wherein each of the first OFDM packet and the shifted version of the OFDM packet corresponds to one of the plurality of impulse responses.

5. The method of claim 4, wherein an impulse response corresponding to the shifted version of the OFDM packet occurs earlier in time than an impulse response corresponding to the first OFDM packet.

6. The method of claim 4, wherein the legacy OFDM receiver is a single-input, single-output (SISO) receiver device.

7. The method of claim 1, further comprising transmitting the first OFDM packet and the shifted version of the OFDM packet from a multiple-antenna transmitter device.

8. A signal transmitting system for transmitting orthogonal frequency division multiplexing (OFDM) signals comprising:
    a first transmit processor for generating a first OFDM packet for transmission including a guard interval portion and a symbol data portion each compromised of a plurality of samples;
    a second transmit processor for cyclically advancing the first OFDM packet by shifting the samples in a first direction an amount less than a sample duration of the guard interval portion to generate a shifted version of the first OFDM packet for transmission in which at least a non-zero number of the samples from the symbol data portion of the first OFDM packet are shifted into the guard interval portion of the shifted version and a same non-zero number of samples from the guard interval portion of the first OFDM packet are shifted out of the guard interval portion of die shifted version;
    a plurality of radio transmitters for converting the OFDM packet and the shifted version of the OFDM packet to corresponding radio signals; and
    a plurality of radio antennas correspondingly coupled to the plurality of radio transmitters for transmitting the radio signals;
    wherein the first transmit processor and the second transmit processor are configured to substantially simultaneously cause the transmission of the first OFDM packet and the shifted version of the OFDM packet via corresponding transmitters and antennas.

9. The system of claim 8, wherein each of the first and second transmit processors includes a cyclic extension module for performing cyclical advancements.

10. The system of claim 9, wherein each of the cyclic extension modules is configured to cyclically advance the OFDM packet for a duration of less than one half of sample duration of the guard interval.

11. The system of claim 9, wherein each of the cyclic extension modules is configure to cyclically advance the OFDM packet for a duration of less than approximately 800 nanoseconds.

12. The system of claim 8, wherein the first transmit processor is configured to receive incoming data and interleave the received data into a plurality of sub-carrier channels.

13. The system of claim 8, wherein each of the plurality of transmit processors further includes an Inverse Fast Fourier (IFFT) module for generating OFDM symbols from incoming data.

14. The system of claim 8, wherein the first and second transmit processors perform the cyclical advancements on baseband signals.

15. The system of claim 8, wherein the first and second transmit processors include application specific integrated circuits (ASICs).

16. The system of claim 8, wherein the transmitter is an 802.11 compliant device.

17. The system of claim 8, wherein the first and second transmit processors include field programmable gate arrays (FPGAs).

18. The system of claim 8, wherein the first and second transmit processors include firmware stored in a memory device and executed by a suitable instruction execution system.

19. A signal transmitting system for transmitting orthogonal frequency division multiplexing (OFDM) signals comprising:

means for generating a first OFDM packet for transmission including a guard interval portion and a symbol data portion each compromised of a plurality of samples;

means for cyclically advancing the first OFDM packet including a guard interval portion and a symbol data portion each compromised of a plurality of samples by shifting the samples in a first direction an amount less than a sample duration of the guard interval portion to generate a shifted version of the first OFDM packet for transmission in which at least a non-zero number of the samples from the symbol data portion of the first OFDM packet we shifted into the guard interval portion of the shifted version and a same non-zero number of samples from the guard interval portion of the first OFDM packet are shifted out of the guard interval portion of the shifted version;

means for convening the first OFDM packet and the shifted version of the OFDM packet to corresponding radio signals; and means for substantially simultaneously causing the transmission of the first OFDM packet and the shifted version of the OFDM packet.

20. The system of claim 19, wherein the cyclic advance has a duration less than one of half of sample duration of the guard interval of the OFDM packet.

21. The system of claim 19, further comprising a legacy receiver, and wherein the cyclical advancements of the shifted version of the OFDM packet cause the legacy receiver to produce a plurality of impulse responses in an acquisition process, and wherein each of the first OFDM packet and the shifted version of the OFDM packet corresponds to one of the plurality of impulse responses.

* * * * *

UNITED STATES PATENT AND TRADEMARK OFFICE
CERTIFICATE OF CORRECTION

PATENT NO. : 7,623,439 B2 Page 1 of 1
APPLICATION NO. : 11/121661
DATED : November 24, 2009
INVENTOR(S) : Webster et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 937 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,623,439 B2  
APPLICATION NO. : 11/121661  
DATED : November 24, 2009  
INVENTOR(S) : Mark A. Webster and Michael J. Seals Page 1 of 1

It is certified that error appears in the above-identified patent and that said Letters Patent is hereby corrected as shown below:

Claim 8, Col. 10, Line 24:

Delete the word "die" and replace with --the--

Signed and Sealed this
Twenty-eighth Day of December, 2010

David J. Kappos
*Director of the United States Patent and Trademark Office*